United States Patent
Weninger et al.

(10) Patent No.: US 12,525,227 B2
(45) Date of Patent: Jan. 13, 2026

(54) SYSTEM AND METHOD FOR SPECTRAL POOLING IN STREAMING SPEECH PROCESSING

(71) Applicant: Microsoft Technology Licensing, LLC, Redmond, WA (US)

(72) Inventors: Felix Weninger, Burlington, MA (US); Dario Albesano, Venaria Reale (IT); Puming Zhan, Brookline, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 18/162,186

(22) Filed: Jan. 31, 2023

(65) Prior Publication Data
US 2024/0127802 A1  Apr. 18, 2024

Related U.S. Application Data

(60) Provisional application No. 63/416,668, filed on Oct. 17, 2022.

(51) Int. Cl.
*G10L 15/16* (2006.01)
*G10L 21/02* (2013.01)

(52) U.S. Cl.
CPC .............. *G10L 15/16* (2013.01); *G10L 21/02* (2013.01)

(58) Field of Classification Search
CPC ......... G10L 15/16; G10L 15/20; G10L 25/30; G10L 15/22; G10L 19/008; G10L 21/02; G06N 3/04; G06N 3/084; G06N 3/044; G06N 3/0464; G06N 3/02
See application file for complete search history.

(56) References Cited

U.S. PATENT DOCUMENTS

| | | | |
|---|---|---|---|
| 10,210,860 B1 * | 2/2019 | Ward | G06N 3/044 |
| 10,339,921 B2 * | 7/2019 | Sainath | G06N 3/045 |
| 11,727,926 B1 * | 8/2023 | Liu | G10L 21/0208 |
| | | | 704/232 |
| 2015/0170020 A1 * | 6/2015 | Garimella | G06N 3/082 |
| | | | 706/14 |
| 2018/0060724 A1 * | 3/2018 | Wang | G06N 3/045 |
| 2018/0068675 A1 * | 3/2018 | Variani | G10L 15/20 |
| 2019/0012594 A1 * | 1/2019 | Fukuda | G06N 3/04 |
| 2019/0156819 A1 | 5/2019 | Shafran | |
| 2020/0035222 A1 * | 1/2020 | Sypniewski | G06N 3/044 |
| 2021/0056958 A1 * | 2/2021 | Lugosch | G10L 25/90 |
| 2021/0193174 A1 * | 6/2021 | Enzinger | G10L 17/00 |
| 2021/0295859 A1 * | 9/2021 | Variani | G10L 15/20 |
| 2021/0383190 A1 * | 12/2021 | Park | G06N 3/082 |

(Continued)

OTHER PUBLICATIONS

International Search Report and Written Opinion received for PCT Application No. PCT/US2023/031797, mailed on Dec. 4, 2023, 15 pages.

(Continued)

*Primary Examiner* — Jakieda R Jackson
(74) *Attorney, Agent, or Firm* — Workman Nydegger

(57) ABSTRACT

A method, computer program product, and computing system for inserting a spectral pooling layer into a neural network of a speech processing system. An output of a hidden layer of the neural network is filtered using the spectral pooling layer with a non-integer stride. The filtered output is provided to a subsequent hidden layer of the neural network.

17 Claims, 5 Drawing Sheets

(56) References Cited

U.S. PATENT DOCUMENTS

| | | | | |
|---|---|---|---|---|
| 2022/0238113 A1* | 7/2022 | Nitta | ............... | G10L 25/18 |
| 2022/0309315 A1* | 9/2022 | Aladahalli | ............ | G06N 3/084 |
| 2022/0343894 A1* | 10/2022 | Doutre | ................ | G10L 15/18 |
| 2023/0013370 A1* | 1/2023 | Li | ........................ | G10L 21/02 |
| 2023/0346216 A1* | 11/2023 | Ma | ....................... | G16H 50/20 |

OTHER PUBLICATIONS

Passricha et al., "A Comparative Analysis of Pooling Strategies for Convolutional Neural Network Based Hindi ASR", Journal of Ambient Intelligence and Humanized Computing, Springer Berlin Heidelberg, vol. 11, No. 2, May 24, 2019, pp. 675-691.

Serpa et al., "Milestones and New Frontiers in Deep Learning", 2019 32nd SIBGRAPI Conference on Graphics, Patterns and Images Tutorials (SIBGRAPI-T), IEEE, Oct. 28, 2019, pp. 22-35.

Andrusenko, et al., "Uconv-Conformer: High Reduction of Input Sequence Length for End-To-End Speech Recognition", In Repository of arXiv:2208.07657v1, Aug. 16, 2022, 5 Pages.

Burchi, et al., "Efficient Conformer: Progressive Downsampling and Grouped Attention for Automatic Speech Recognition", In Proceedings of Automatic Speech Recognition and Understanding Workshop, Dec. 13, 2021, pp. 8-15.

Kim, et al., "Squeezeformer: an Efficient Transformer for Automatic Speech Recognition", In Repository of arXiv:2206.00888v1, Jun. 2, 2022, 13 Pages.

Riad, et al., "Learning Strides in Convolutional Neural Networks", In Repository of arXiv:2202.01653v1, Feb. 3, 2022, 17 Pages.

Rippel, et al., "Spectral Representations for Convolutional Neural Networks", In Proceedings of Neural Information Processing Systems, Jun. 2015, 9 Pages.

Sukhbaatar, et al., "Adaptive Attention Span in Transformers", In Proceedings of 57th Annual Meeting of the Association for Computational Linguistics, Jul. 28, 2019, pp. 331-335.

Weninger, et al., "Conformer With Dual-Mode Chunked Attention for Joint Online and Offline ASR", In Proceedings of Interspeech 2022, Sep. 18, 2022, pp. 2053-2057.

U.S. Appl. No. 63/416,668, filed Oct. 17, 2022.

International Preliminary Report on Patentability received for PCT Application No. PCT/US2023/031797, mailed on May 1, 2025, 08 pages.

* cited by examiner

SYSTEM AND METHOD FOR SPECTRAL POOLING IN STREAMING SPEECH PROCESSING

RELATED APPLICATION(S)

This application claims the benefit of U.S. Provisional Application No. 63/416,668 filed on 17 Oct. 2022, the entire contents of which is incorporated herein by reference.

BACKGROUND

Speech processing has historically been limited by the computing resources of the speech recording device. With the ability to stream speech signals to more powerful computing devices, limitations in speech processing move from speech recording devices to the machine learning models and neural networks used by the larger computing devices. For example, attention mechanisms within conventional neural networks consume significant amounts of time. By limiting attention, computing cost and latency are reduced while reducing accuracy. Conventional neural networks also reduce latency and computing resource consumption by downsampling. However, downsampling by even small factors has a drastic effect on computational costs and speech processing accuracy. As such, these approaches suffer from limited fine-tuning in the speed/accuracy trade-off.

BRIEF DESCRIPTION OF THE DRAWINGS

Like reference symbols in the various drawings indicate like elements.

DETAILED DESCRIPTION OF THE PREFERRED EMBODIMENTS

Figure 1:
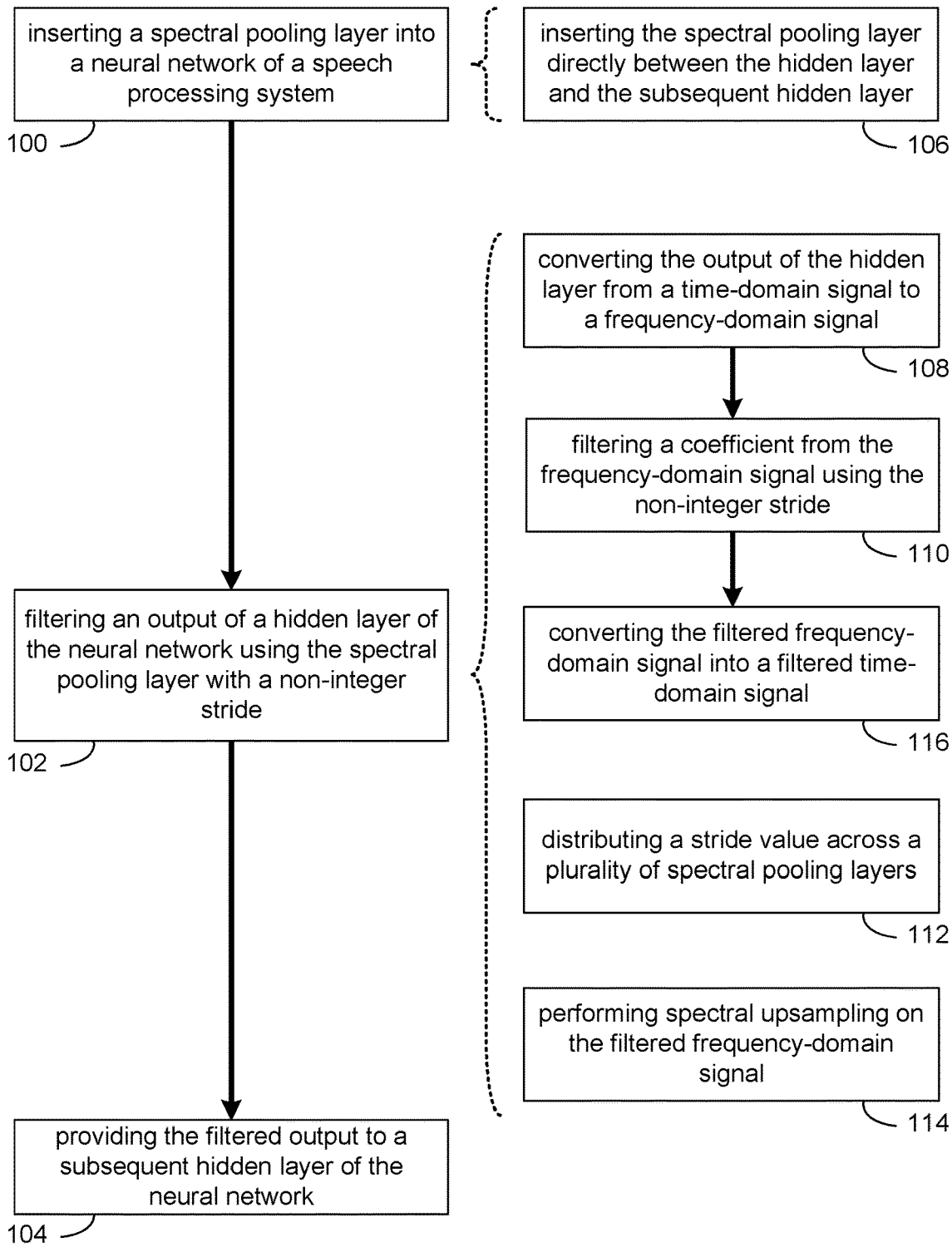
FIG. 1 is a flow chart of one implementation of the spectral pooling process.

As will be discussed in greater detail below, implementations of the present disclosure use spectral pooling (i.e., dimensional reduction of a time-domain input signal by truncating a frequency-domain representation of the input signal) to improve the granularity in the computing cost/accuracy trade-off. For example and as discussed above, conventional approaches for balancing streaming computing resource consumption and speech processing accuracy use downsampling (i.e., reducing the number of samples processed per signal). This reduces the computational load in terms of less data to process in a neural network. However, with less data, the neural network's results are less accurate/more prone to misidentification or classification of input signals. For example, in the context of speech processing, an input speech signal is processed by a neural network of a speech processing system to produce an output. In one example, the output is text recognized from the input speech signal (i.e., ASR). In this example, the neural network is more accurate (i.e., more correct output text for a given input speech signal) by processing more samples from the input speech signal but requires more processing resources. The ability to efficiently process speech is limited by integer-based downsampling factors.

However, with spectral sampling, implementations of the present disclosure allow for non-integer/floating point-based strides to provide high granularity during speech processing with a neural network. Specifically, by using spectral pooling layers and stride values distributed across the spectral pooling layers, more control over the computing cost/accuracy trade-off is possible. Additionally, by using spectral pooling with speech processing, matrix representations are used to perform the conversion of time-domain signals into the frequency-domain for filtering and back to the time-domain. In this manner, typically expensive signal conversion and filtering is achieved using matrix multiplication. Accordingly, implementations of the present disclosure allow for more granular control over speech processing accuracy and more efficient processing of speech signals using matrix-based spectral pooling.

The details of one or more implementations are set forth in the accompanying drawings and the description below. Other features and advantages will become apparent from the description, the drawings, and the claims.

The Spectral Pooling Process:

Referring to FIGS. 1-5, spectral pooling process 10 inserts 100 a spectral pooling layer into a neural network of a speech processing system. An output of a hidden layer of the neural network is filtered 102 using the spectral pooling layer with a non-integer stride. The filtered output is provided 104 to a subsequent hidden layer of the neural network.

As discussed above, implementations of the present disclosure allow for non-integer/floating point-based strides to provide high granularity during speech processing with a neural network. A stride is the reduction factor in the output of the hidden layer. For example, the stride defines the factor by which the input will be reduced during processing by a hidden layer. As will be discussed in greater detail below, by using spectral pooling layers and stride values distributed across the spectral pooling layers, more control over the computing cost/accuracy trade-off is realized.

In some implementations, spectral pooling process 10 inserts 100 a spectral pooling layer into a neural network of a speech processing system. As discussed above, spectral pooling is the dimensional reduction of a time-domain input signal by truncating a frequency-domain representation of the input signal. In some implementations, a speech processing system uses a neural network to process input speech. For example, suppose a speech processing system is an online streaming ASR system that generates a text output for a streamed input speech signal. In this example, the ASR system uses a neural network to perform end-to-end processing of the input speech signal into an output text representation of the speech signal. As will be discussed in greater detail below and in some implementations, the input speech signal is processed by an online streaming neural network (i.e., a neural network that does not need access to the entire speech signal before starting the recognition process). In this example, the speech signal is processed in portions or chunks as opposed to being processed all at once as in an offline (batch-mode) neural network (i.e., where the speech signal is entirely defined before processing with the neural network).

Figure 2:
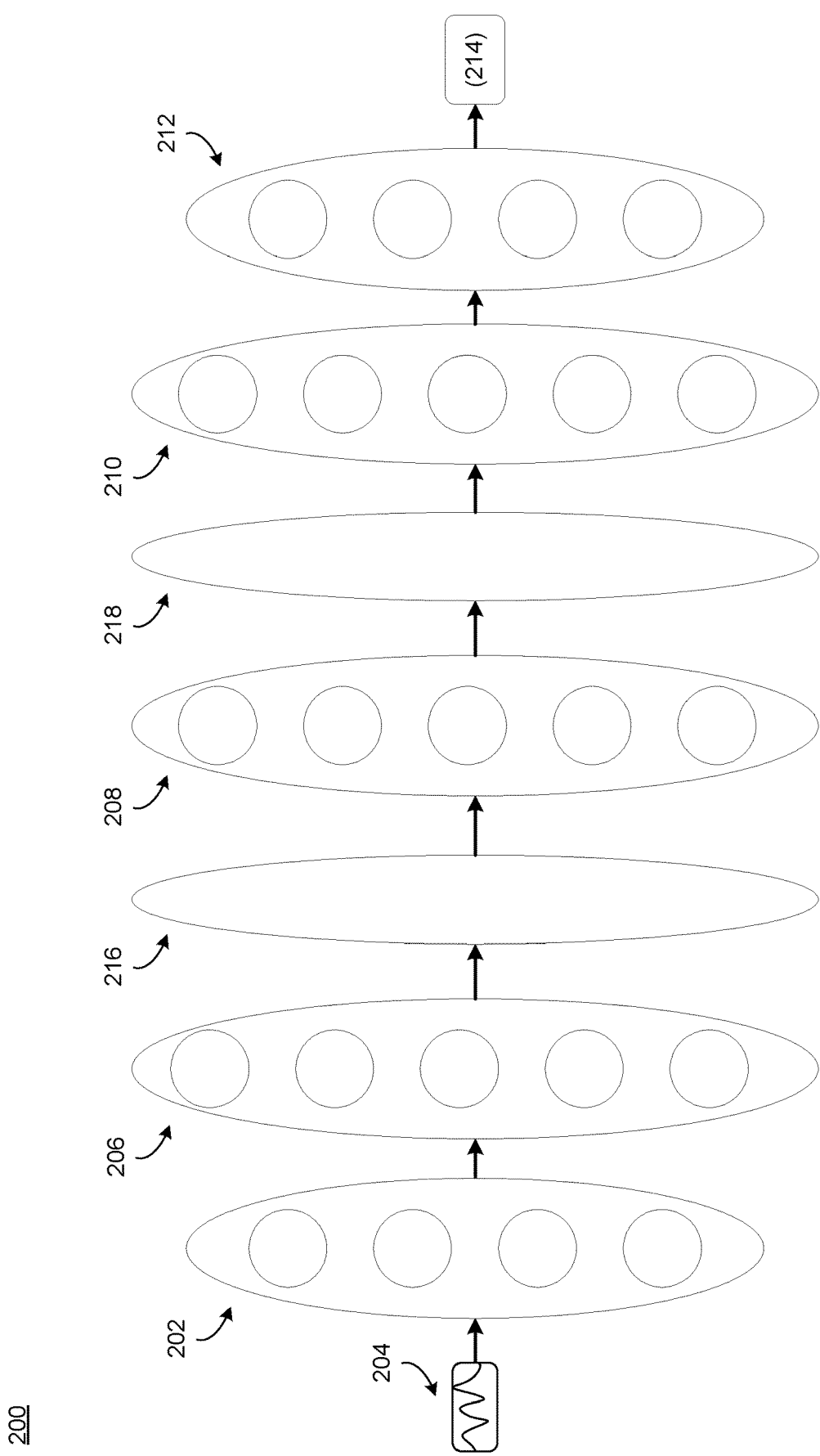
FIG. 2 is a diagrammatic view of a neural network in accordance with one implementation of the spectral pooling process.

Referring also to FIG. 2, neural networks/artificial neural networks (e.g., neural network 200) include an input layer (e.g., input layer 202) that receives input data. In the example of speech processing, input layer 202 receives a speech signal (e.g., speech signal 204) in the time-domain. Neural network 200 includes a plurality of hidden layers (e.g., hidden layers 206, 208, 210) between the input layer (e.g., input layer 202) and an output layer (e.g., output layer 212). In some implementations, hidden layers (e.g., hidden layers 206, 208, 210) are mathematical functions each designed to produce an output specific to an intended result. For example, some forms of hidden layers are known as squashing functions. These functions are particularly useful when the intended output of the algorithm is a probability because they take an input and produce an output value between 0 and 1, the range for defining probability. Each hidden layer processes an input signal in the time-domain with a number of samples or frames. For example, speech signal 204 is a time-domain signal composed of a number of time frames or portions with speech content. In some implementations, with more frames, more computing resources and time are used by the neural network to produce a speech processing output (e.g., speech processing output 214).

In some implementations, spectral pooling process 10 inserts 100 a spectral pooling layer (e.g., spectral pooling layers 216, 218) between hidden layers of the neural network. In some implementations, inserting 100 the spectral pooling layer into the neural network includes inserting 106 the spectral pooling layer directly between a hidden layer and a subsequent hidden layer. For example, spectral pooling process 10 provides the output of a hidden layer (e.g., hidden layer 206) to a spectral pooling layer (e.g., spectral pooling layer 216) and the output of spectral pooling layer 216 to a subsequent hidden layer (e.g., hidden layer 218). In some implementations, multiple spectral pooling layers are inserted 106 directly between pairs of hidden layers of the neural network. For example, spectral pooling layer 216 is inserted directly between hidden layers 206, 208 and spectral pooling layer 218 is inserted directly between hidden layers 208, 210. In this manner, spectral pooling layers are inserted 106 directly between any or all of the hidden layers of the neural network.

In some implementations, spectral pooling process 10 filters 102 an output of a hidden layer of the neural network using the spectral pooling layer with a non-integer stride. For example, filtering 102 the output of the hidden layer includes reducing the size of the output of the hidden layer. In some implementations, the output of the hidden layer is a time-domain signal composed of a number of frames or segments. As discussed above, processing more frames requires more computing resources. As such, spectral pooling process 10 uses spectral pooling to filter a plurality of frames from the output of the hidden layer for more efficient processing in subsequent layers of the neural network. In some implementations, spectral pooling process 10 uses spectral pooling with a non-integer stride to filter 102 the output of the hidden layer. A stride is the reduction factor in the output of the hidden layer. Conventional approaches to pooling are limited to integer strides which result in drastic impacts on computational cost or accuracy. For example, with a stride of "two" or more applied on a single layer, the number of frames or samples is reduced by half which greatly reduces the accuracy of the neural network. However, spectral pooling process 10 uses a non-integer/floating point stride parameter that is distributable across multiple spectral pooling layers.

In some implementations, the stride is user-defined and provided during the initialization or training of the neural network. In one example, the stride is defined in a user interface with a stride value for each spectral pooling layer. In some implementations, the stride is a default value associated with the neural network. In one example and as will be discussed in greater detail below, the stride is a default non-integer value that is distributable across multiple spectral pooling layers. In some implementations, the stride is "learned" or determined by spectral pooling process 10.

In some implementations, the stride is a trainable parameter. For example, spectral pooling process 10 includes a downsampling layer with learnable stride values for particular spectral pooling layers of the neural network. The layer learns the size of a cropping mask in the Fourier domain by backpropagation. For example, because speech signals are one-dimensional signals, the cropping mask is defined as shown below in Equation 1:

$$\mathrm{mask}_{(s,T,R)}(m) = \min\left[\max\left[\frac{1}{R}\left(R + \frac{T}{2s} - \left|\frac{T}{2} - n\right|\right), 0\right], 1\right] \quad (1)$$

where s is the stride, R is a hyperparameter that controls the smoothing of the mask, and $$n \in \left[0, \frac{T}{2} + 1\right].$$

As shown in Equation 1, the mask is applied in the Fourier domain to perform low pass filtering and then to crop the Fourier coefficients where the mask is zero. The cropped mask is transformed back to the time domain by the inverse discrete Fourier transform (DFT). In some implementations, the cropping mask is useful to ensure convergence of the training process because it makes the result smooth before cropping.

In some implementations, striding affects the computational cost in subsequent layers of the neural network. Accordingly, spectral pooling process 10 defines a regularization term or value based on each encoder layer stride as shown below in Equation 2:

$$\lambda J\left(\left(S^l\right)_{l=1}^{l=L}\right) = \lambda \sum_{l=1}^{L} \prod_{i=1}^{l} \frac{1}{s^i} \quad (2)$$

where $\lambda$ is the regularization weight, $S^l$ is the total stride of layer l, $s^i$ is the stride introduced by layer i, and L is the total number of layers in the encoder.

By tuning the $\lambda$ parameter, the regularization term J provides balance between neural network accuracy (i.e., reduction in the number of frames reduces the accuracy by removing data (e.g., speech content in the example of speech processing)) and neural network processing efficiency (i.e., greater stride values result in fewer frames to process with each successive hidden layer, thus improving the network efficiency). In this manner, the stride is dynamically determined allowing a more optimal stride configuration at a lower cost.

In some implementations, each input to the spectral pooling layer includes a number of frames. Spectral pooling process 10 filters 102 the output of the hidden layer to reduce the number of frames as shown below in Equation 3:

$$T_s = \lfloor T/S \rfloor \text{ frames} \quad (3)$$

where T is the number of time frames in the output of the hidden layer, s is the stride parameter, and $T_s$ is the number of time frames in the spectral pooling output defined by the floor function with T and s.

Figure 3:
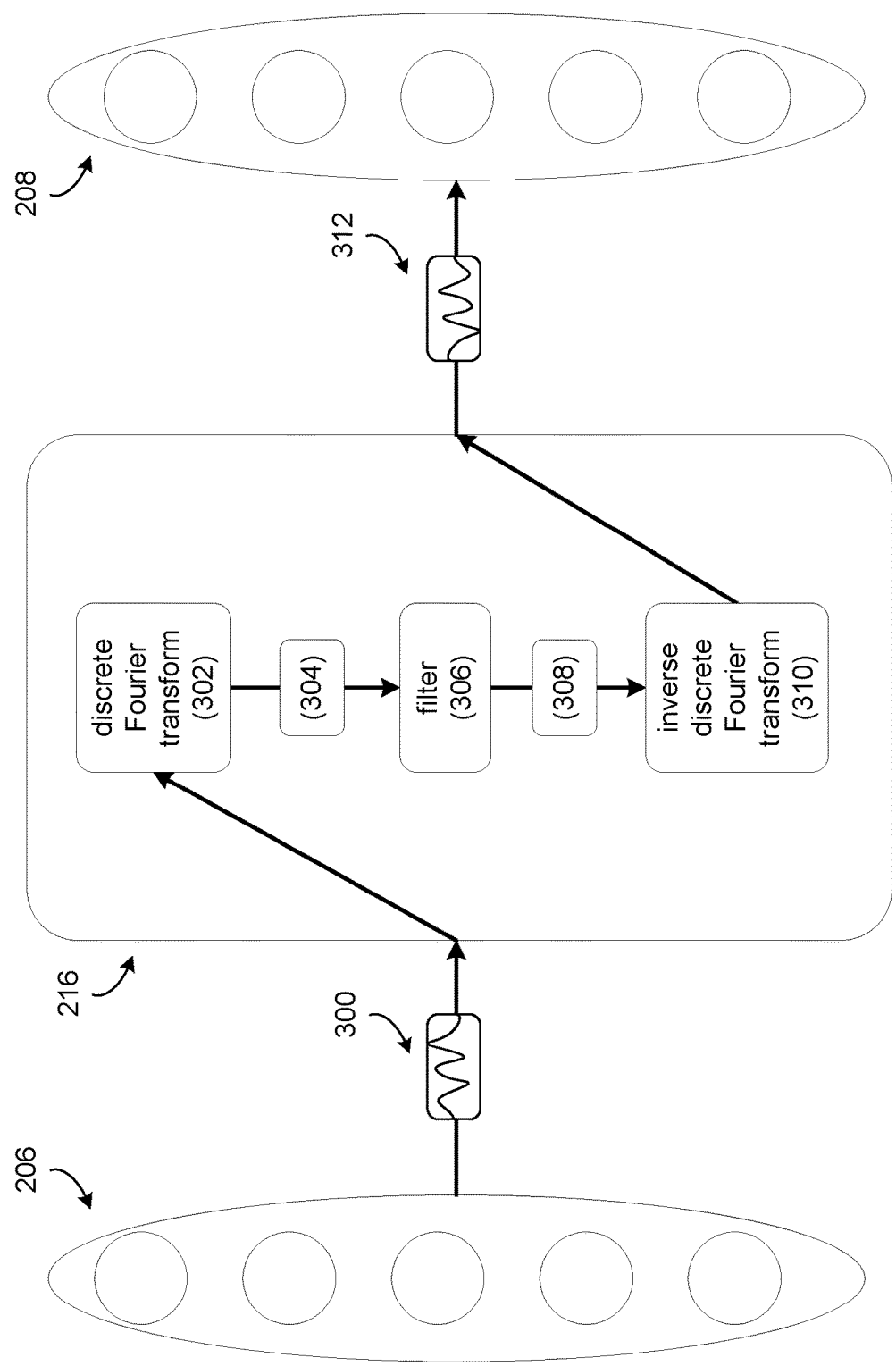
FIGS. 3-4 are diagrammatic views of a spectral pooling layer in accordance with various implementations of the spectral pooling process.

In some implementations, filtering 102 the output of the hidden layer of the neural network includes converting 108 the output of the hidden layer from a time-domain signal to a frequency-domain signal. For example, spectral pooling process 10 converts 108 the output of the hidden layer from the time-domain signal to the frequency-domain signal. Referring also to FIG. 3, spectral pooling process 10 performs a discrete Fourier transform (DFT) to convert 108 the time-domain signal output from the hidden layer (e.g., time-domain signal 300) to the frequency domain. A DFT (e.g., discrete Fourier transform 302) converts 108 a finite sequence of equally-spaced samples or frames of the time-domain signal into a same-length sequence of equally-spaced samples as a complex-valued function of frequency.

In some implementations, filtering 102 the output of the hidden layer of the neural network includes filtering 110 a coefficient from the frequency-domain signal using the non-integer stride. For example, with spectral pooling, spectral pooling process 10 the signal is cut into short segments, each is transformed into a frequency domain signal. The frequency-domain signal (e.g., frequency-domain signal 304) includes various coefficients that correspond to various frequencies of the signal. In some implementations, spectral pooling process 10 filters a number (e.g., a predefined value or user-defined value) of the Fourier coefficients of high frequencies (e.g., by preserving a predefined number of coefficients, a predefined range of frequencies, or a user-defined range of frequencies). In some implementations, high frequencies are generally unnoticeable in speech processing environments. Accordingly, spectral pooling process 10 filters the output of the hidden layer by filtering 110 one or more coefficients of higher frequencies from the frequency-domain signal while preserving the lower frequency coefficients which are more important than higher frequency coefficients during speech processing. Referring again to FIG. 3 and in some implementations, spectral pooling process 10 filters 102 frequency-domain signal 304 using a filter (e.g., filter 306) as discussed above to generate a filtered frequency-domain signal (e.g., filtered frequency-domain signal 308).

In some implementations, filtering 102 the output of the hidden layer of the neural network using the spectral pooling layer includes distributing 112 a stride value across a plurality of spectral pooling layers. For example, different stride values may be used for separate spectral pooling layers. In some implementations, introducing spectral pooling layers to lower or earlier layers of the neural network improves processing speed but tends to degrade the accuracy. As such, spectral pooling process 10 uses the flexibility of a non-integer/floating point stride to distribute a stride over multiple spectral pooling layers. For example, suppose a neural network includes twenty layers. In this example, spectral pooling process 10 distributes a stride value of "two" over two layers as shown in Table 1 below:

TABLE 1

| $s_1$ | $s_2$ | dev | eval | RTF |
|---|---|---|---|---|
| Baseline | 2 @ 10th | 12.96 | 12.19 | 1.043 |
| 4/3 @ 5th | 3/2 @ 10th | 13.05 | 12.22 | 0.927 |
| 3/2 @ 5th | 4/3 @ 10th | 12.99 | 12.18 | 0.895 |
| 3/2 @ 3rd | 4/3 @ 10th | 13.04 | 12.25 | 0.843 |
| 3/2 @ 3rd | 4/3 @ 8th | 13.14 | 12.37 | 0.824 | where "$s_1$" is the first stride value, "$s_2$" is the second stride value, "dev" represents word error rates for the development set, "eval" represents word error rates for the evaluation set, and "RTF" is the real time factor.

As shown above in Table 1, the best distributed stride configuration yields a 21% RTF reduction at 0.5% word error rate (WER). In this manner, by distributing 112 a stride value across multiple spectral pooling layers, spectral pooling process 10 allows more efficient balancing between computing costs (e.g., in terms of RTF) and accuracy (in terms of WER).

In some implementations, filtering 102 the output of the hidden layer of the neural network using the spectral pooling layer includes performing 114 spectral upsampling on the filtered frequency-domain signal. Spectral upsampling includes inserting zero-valued samples between original samples to increase the sampling rate. For example, recent advances in conformer architecture provide a U-Net like architecture with upsampling and downsampling which can extend to a stride value of sixteen (e.g., 160 milliseconds frame rate). In some implementations, spectral pooling process 10 performs 114 spectral upsampling as an inverse operation of spectral pooling with non-integer stride. Performing 114 spectral upsampling includes defining or receiving an upsampling factor and appending zeroes in the Fourier domain. Spectral pooling process 10 then transforms this appended frequency-domain signal to a time-domain signal. In one example, the resulting length of the time-domain signal is $\lfloor T \cdot u \rfloor$ where T is the time-domain signal and u is the upsample factor.

In one example where the above-described spectral pooling architecture is combined with a U-Net architecture by additional downsampling then upsampling before the last neural network layer, the following results are observed as shown in Table 2:

TABLE 2

| Downsampling | Upsampling | dev | eval | RTF |
|---|---|---|---|---|
| Decimation 2 @ 8th, Decimation 2 @ 12th | Repeat 2 @ 15th | 12.64 | 11.85 | 0.852 |
| Decimation 2 @ 8th, Pool 2.0 @ 12th | Upsample 2.0 @ 15th | 12.63 | 11.86 | 0.887 |
| Pool 1.5 @ 3rd, Pool 1.33 @ 8th, Decimation 2 @ 12th | Repeat 2 @ 15th | 12.83 | 12.02 | 0.776 |
| Pool 1.5 @ 3rd, Pool 1.33 @ 8th, Pool 2.0 @ 12th | Upsample 2.0 @ 15th | 12.73 | 11.88 | 0.787 |
| Pool 1.5 @ 3rd, Pool 1.33 @ 8th, Pool 1.5 @ 12th | Upsample 1.5 @ 15th | 12.70 | 11.84 | 0.818 |

As shown above in Table 2, the real time factor is improved by 7.6% at less than 1% word error rate.

In some implementations, filtering 102 the output of the hidden layer of the neural network includes converting 116 the filtered frequency-domain signal into a filtered time-domain signal. Converting 116 the filtered frequency-domain signal includes performing an inverse discrete Fourier transform to convert the filtered frequency-domain signal into a filtered time-domain signal. Performing an inverse discrete Fourier transform (e.g., inverse discrete Fourier transform 310) on a frequency signal takes the frequency series of complex values and maps them back into the original time series. As shown in FIG. 3, spectral pooling process 10 converts 116 filtered frequency-domain signal using inverse discrete Fourier transform 310 to generate a filtered time-domain signal (e.g., filtered time-domain signal 312).

In some implementations, spectral pooling process 10 provides 104 the filtered output to a subsequent hidden layer of the neural network. For example, in response to filtering 102 the output of the hidden layer, spectral pooling process 10 provides 104 the filtered output to a subsequent hidden layer for subsequent processing. As the filtered output is reduced in dimensionality relative to the output received from the hidden layer, downstream processing of the filtered output requires fewer computing resources while experiencing some accuracy degradation. However and as discussed above, spectral pooling process 10 uses a non-integer stride to maximize the computation cost savings while minimizing the accuracy impact. Referring again to FIG. 3, spectral pooling process 10 provides 104 the filtered time-domain signal (e.g., filtered time-domain signal 312) to subsequent hidden layer 208 of neural network 200 for subsequent processing.

In some implementations, spectral pooling process 10 filters 102 an output of a hidden layer of the neural network using the spectral pooling layer with a non-integer stride and a matrix filter. For example, discrete Fourier transforms are inherently offline (e.g., not computed during streaming) as is self-attention. In some implementations, online conformers address this limitation by "chunking" attention. In some implementations, spectral pooling process 10 uses a constant chunk size to precompute a matrix filter such that each time signal/chunk is multiplied by the matrix filter to generate the filtered output. In this manner, spectral pooling process 10 avoids complex DFT operations and further enhances the efficiency of the neural network.

Figure 4:
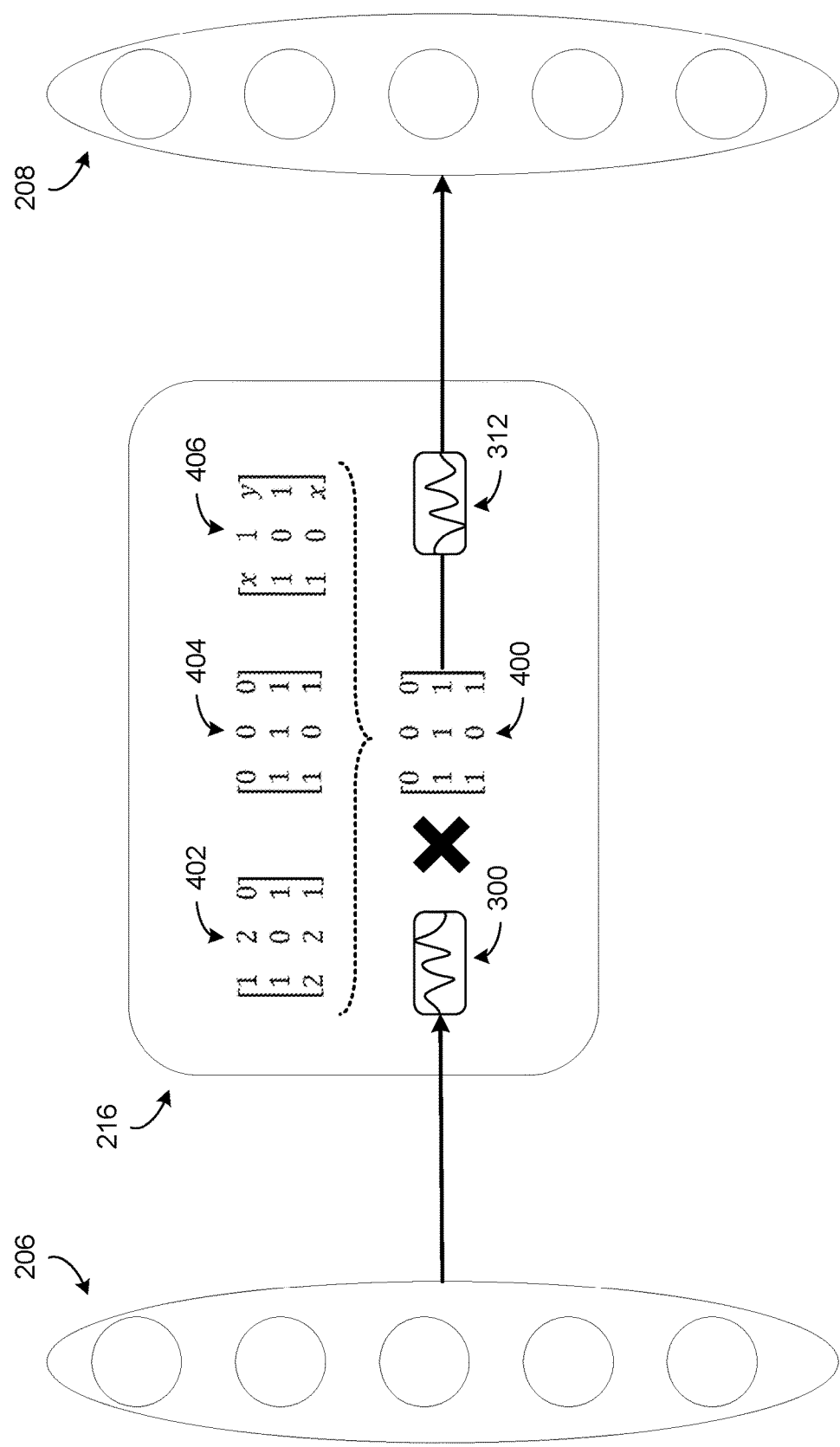

In some implementations, filtering the output of the hidden layer of the neural network using the spectral pooling layer includes generating the matrix filter by generating a complex matrix representation of a discrete Fourier transform, generating a coefficient filtering matrix, generating a complex matrix representation of an inverse Fourier transform, generating the matrix filter by multiplying the complex matrix representation of the discrete Fourier transform, the coefficient filtering matrix, and the complex matrix representation of an inverse Fourier transform, and generating the filtered output by multiplying the output of the hidden layer and the matrix filter. Referring also to FIG. 4 and in some implementations, spectral pooling process 10 generates a matrix filter (e.g., matrix filter 400). Matrix filter 400 is the combination of: a complex matrix representation of a discrete Fourier transform (e.g., complex matrix representation of a discrete Fourier transform 402), a coefficient filtering matrix (e.g., coefficient filtering matrix 404), and a complex matrix representation of an inverse Fourier transform (e.g., complex matrix representation of an inverse Fourier transform 406).

In some implementations, spectral pooling process 10 generates complex matrix representation of a discrete Fourier transform 402 by generating a transformation matrix with matrix values representative of the complex values of the discrete Fourier transform. Spectral pooling process 10 generates coefficient filtering matrix 404 by generating a matrix with matrix values that retain or remove particular coefficients (e.g., coefficients associated with higher frequencies). In some implementations, spectral pooling process 10 applies the non-integer stride to the values of coefficient filtering matrix 404 to filter particular coefficients from the time-domain signal. Spectral pooling process 10 generates complex matrix representation of an inverse discrete Fourier transform 406 by generating a transformation matrix with matrix values representative of the mapping of complex values of the discrete Fourier transform to the time domain. As shown in FIG. 4, complex matrix representation of a discrete Fourier transform 402, coefficient filtering matrix 404, and complex matrix representation of an inverse Fourier transform 406 are multiplied to form matrix filter 400.

In some implementations, filtering 102 the output of the hidden layer of the neural network using the spectral pooling layer includes multiplying the output by a real portion of the complex matrix filter. As shown in FIG. 4, spectral pooling process 10 multiplies time-domain signal 300 by matrix filter 400 to filter 102 time-domain signal 300. In this manner, spectral pooling process 10 uses matrix filter 400 to represent the transformations and filtering of spectral pooling to generate filtered time-domain signal 312. As matrix multiplication between time-domain signal 300 and the real (i.e., non-complex) portion of matrix filter 400 relies on a precomputed matrix filter (e.g., matrix filter 400), spectral pooling process 10 enhances the efficiency of neural network 200 by reducing the amount of resources needed to achieve a desired accuracy.

In some implementations, spectral pooling process 10 provides 104 the filtered output to a subsequent hidden layer of the neural network. For example, in response to filtering 102 the output of the hidden layer, spectral pooling process 10 provides 104 the filtered output to a subsequent hidden layer for subsequent processing. As the filtered output is reduced in dimensionality relative to the output received from the hidden layer, downstream processing of the filtered output requires fewer computing resources while experiencing some accuracy degradation. However and as discussed above, spectral pooling process 10 uses a non-integer stride to maximize the computation cost savings while minimizing the accuracy impact. Referring again to FIG. 4, spectral pooling process 10 provides 104 the filtered time-domain signal (e.g., filtered time-domain signal 312) to subsequent hidden layer 208 of neural network 200 for subsequent processing. In this example, filtered time-domain signal 312 is the product of time-domain signal 300 and matrix filter 400.

In some implementations, spectral pooling process 10 processes an input speech signal using an online streaming neural network. In this example, the entirety of the input speech signal is not processed by the neural network as a single signal. Rather, the input speech signal is processed by the neural network in portions or chunks. The size of the chunk does not only affect the number of inputs processed at once by the online streaming neural network, but also the receptive field (i.e., the number of total inputs that have influence on the output) of its layers (e.g., the receptive field of self-attention is determined by particular parameters (e.g., look-backward, chunk size and look-ahead), and the receptive field of convolutional layers is determined by the kernel size). In some implementations, the exact size of each chunk is generally not known by the neural network when processing. Accordingly, spectral pooling process 10 is able to determine a new chunk size using a previous stride for a previously processed chunk and adjust the receptive field parameters accordingly for the subsequent layers.

For example, suppose that when processing a first chunk of an input speech signal, the encoder of the neural network is configured to process 32 frames following the spectral pooling layer. However, suppose that when processing a second chunk and as discussed above, spectral pooling process 10 determines a new stride or distribution of the stride across the spectral pooling layers which results in only 24 frames being provided to a subsequent hidden layer (e.g., 32 frames/24 frames=1.33 stride value). In this example, spectral pooling process 10 is able to use the previous chunk size (e.g., 24) for the spectral pooling layer to determine the chunk size for the subsequent hidden layer and scales the look-backward, look-ahead and kernel size values for the subsequent self-attention and convolutional layers. Accordingly, spectral pooling process 10 is able to account for changes in the distribution as various sized chunks of an input speech signal is processed and/or when changes in the stride or distribution of the stride are determined. In this manner, spectral pooling process 10 is able to adapt the neural network to address variability in the size of each chunk of the input speech signal using the previous chunk size of the spectral pooling layer.

Figure 5:
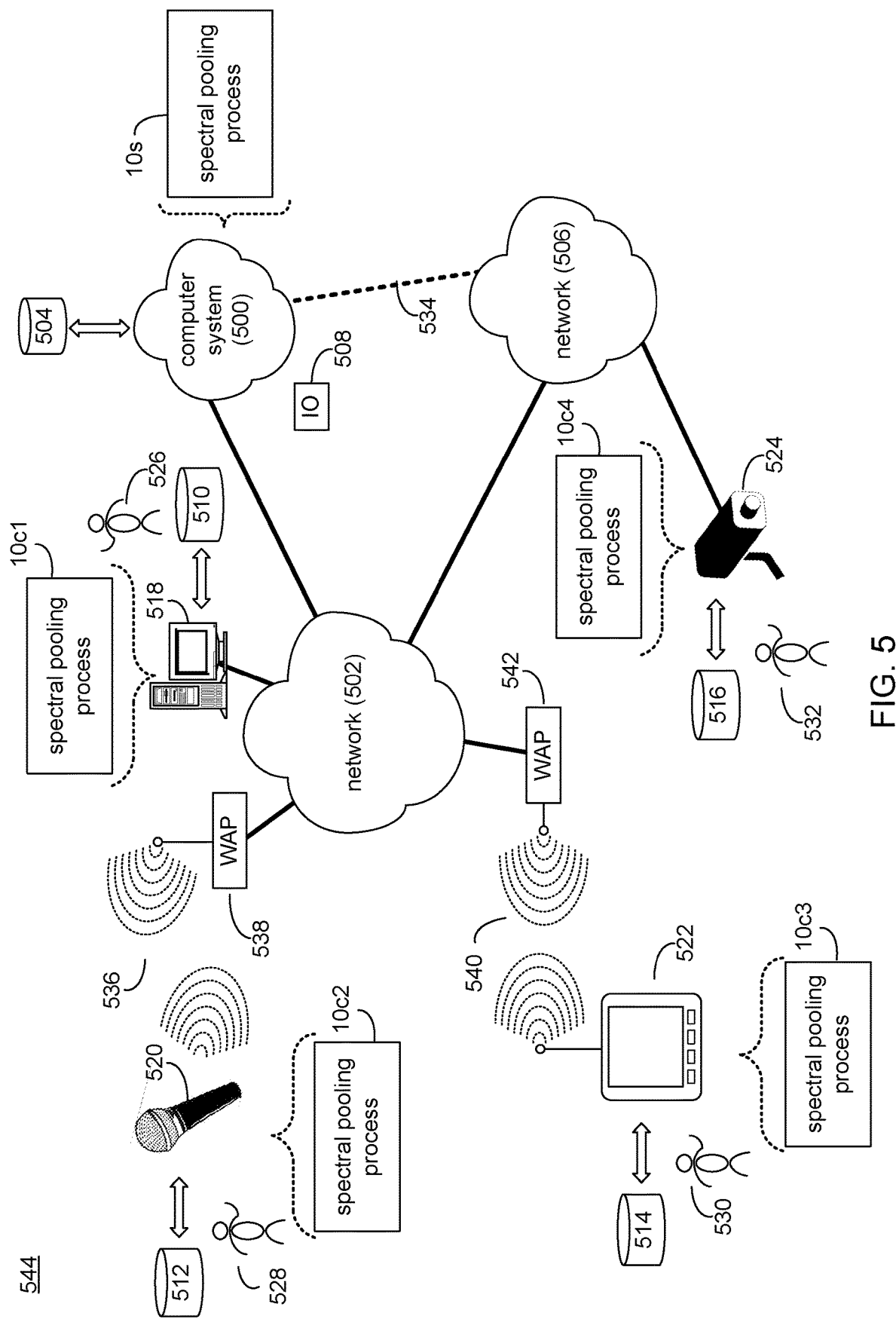
FIG. 5 is a diagrammatic view of a computer system and the spectral pooling process coupled to a distributed computing network.

System Overview:

Referring to FIG. 5, there is shown spectral pooling process 10. Spectral pooling process 10 may be implemented as a server-side process, a client-side process, or a hybrid server-side/client-side process. For example, spectral pooling process 10 may be implemented as a purely server-side process via spectral pooling process 10s. Alternatively, spectral pooling process 10 may be implemented as a purely client-side process via one or more of spectral pooling process 10c1, spectral pooling process 10c2, spectral pooling process 10c3, and spectral pooling process 10c4. Alternatively still, spectral pooling process 10 may be implemented as a hybrid server-side/client-side process via spectral pooling process 10s in combination with one or more of spectral pooling process 10c1, spectral pooling process 10c2, spectral pooling process 10c3, and spectral pooling process 10c4.

Accordingly, spectral pooling process 10 as used in this disclosure may include any combination of spectral pooling process 10s, spectral pooling process 10c1, spectral pooling process 10c2, spectral pooling process 10c3, and spectral pooling process 10c4.

Spectral pooling process 10s may be a server application and may reside on and may be executed by a computer system 500, which may be connected to network 502 (e.g., the Internet or a local area network). Computer system 500 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 500 may execute one or more operating systems.

The instruction sets and subroutines of spectral pooling process 10s, which may be stored on storage device 504 coupled to computer system 500, may be executed by one or more processors (not shown) and one or more memory architectures (not shown) included within computer system 500. Examples of storage device 504 may include but are not limited to: a hard disk drive; a RAID device; a random access memory (RAM); a read-only memory (ROM); and all forms of flash memory storage devices.

Network 502 may be connected to one or more secondary networks (e.g., network 504), examples of which may include but are not limited to: a local area network; a wide area network; or an intranet, for example.

Various IO requests (e.g., IO request 508) may be sent from spectral pooling process 10s, spectral pooling process 10c1, spectral pooling process 10c2, spectral pooling process 10c3 and/or spectral pooling process 10c4 to computer system 500. Examples of IO request 508 may include but are not limited to data write requests (i.e., a request that content be written to computer system 500) and data read requests (i.e., a request that content be read from computer system 500).

The instruction sets and subroutines of spectral pooling process 10c1, spectral pooling process 10c2, spectral pooling process 10c3 and/or spectral pooling process 10c4, which may be stored on storage devices 510, 512, 514, 516 (respectively) coupled to client electronic devices 518, 520, 522, 524 (respectively), may be executed by one or more processors (not shown) and one or more memory architectures (not shown) incorporated into client electronic devices 518, 520, 522, 524 (respectively). Storage devices 510, 512, 514, 516 may include but are not limited to: hard disk drives; optical drives; RAID devices; random access memories (RAM); read-only memories (ROM), and all forms of flash memory storage devices. Examples of client electronic devices 518, 520, 522, 524 may include, but are not limited to, personal computing device 518 (e.g., a smart phone, a personal digital assistant, a laptop computer, a notebook computer, and a desktop computer), audio input device 520 (e.g., a handheld microphone, a lapel microphone, an embedded microphone (such as those embedded within eyeglasses, smart phones, tablet computers and/or watches) and an audio recording device), display device 522 (e.g., a tablet computer, a computer monitor, and a smart television), machine vision input device 524 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 526, 528, 530, 532 may access computer system 500 directly through network 502 or through secondary network 506. Further, computer system 500 may be connected to network 502 through secondary network 506, as illustrated with link line 534.

The various client electronic devices (e.g., client electronic devices 518, 520, 522, 524) may be directly or indirectly coupled to network 502 (or network 506). For example, personal computing device 518 is shown directly coupled to network 502 via a hardwired network connection. Further, machine vision input device 524 is shown directly coupled to network 506 via a hardwired network connection. Audio input device 522 is shown wirelessly coupled to network 502 via wireless communication channel 536 established between audio input device 520 and wireless access point (i.e., WAP) 538, which is shown directly coupled to network 502. WAP 538 may be, for example, an IEEE 802.11a, 802.11b, 802.11g, 802.11n, Wi-Fi, and/or Bluetooth™ device that is capable of establishing wireless communication channel 536 between audio input device 520 and WAP 538. Display device 522 is shown wirelessly coupled to network 502 via wireless communication channel 540 established between display device 522 and WAP 542, which is shown directly coupled to network 502.

The various client electronic devices (e.g., client electronic devices 518, 520, 522, 524) may each execute an operating system, wherein the combination of the various client electronic devices (e.g., client electronic devices 518, 520, 522, 524) and computer system 500 may form modular system 544.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, implemented by a computing system that includes one or more processors and one or more computer-readable hardware storage media having stored thereon computer-executable instructions, the computer-executable instructions being executable by the one or more processors to configure the computer system to implement the method, the method comprising:
   inserting a first spectral pooling layer into a neural network of a speech processing system directly between a first hidden layer of the neural network and a second hidden layer of the neural network;
   filtering an output of the first hidden layer of the neural network using the first spectral pooling layer with a first non-integer stride to generate a first filtered output;
   providing the first filtered output to the second hidden layer of the neural network;
   inserting a second spectral pooling layer into the neural network directly between the second hidden layer of the neural network and a third hidden layer of the neural network;
   filtering an output of the second hidden layer of the neural network using the second spectral pooling layer with a second non-integer stride to generate a second filtered output; and
   providing the second filtered output to the third hidden layer of the neural network.

2. The computer-implemented method of claim 1, wherein filtering the output of the first hidden layer of the neural network includes converting the output of the first hidden layer of the neural network from a time-domain signal to a frequency-domain signal.

3. The computer-implemented method of claim 2, wherein filtering the output of the first hidden layer of the neural network includes filtering a coefficient from the frequency-domain signal using the first non-integer stride to generate a filtered frequency-domain signal.

4. The computer-implemented method of claim 3, wherein filtering the output of the first hidden layer of the neural network includes converting the filtered frequency-domain signal into a filtered time-domain signal.

5. The computer-implemented method of claim 1, wherein filtering the output of the first hidden layer of the neural network using the first spectral pooling layer includes distributing a stride value across at least the first spectral pooling layers and the second spectral pooling layer.

6. The computer-implemented method of claim 3, wherein filtering the output of the first hidden layer of the neural network using the first spectral pooling layer includes performing spectral upsampling on the filtered frequency-domain signal.

7. A computing system comprising:
   one or more processors; and
   one or more computer-readable hardware storage media having stored thereon computer-executable instructions, the computer-executable instructions being executable by the one or more processors to configure the computer system to:
   insert a first spectral pooling layer into a neural network of a speech processing system directly between a first hidden layer of the neural network and a second hidden layer of the neural network;
   filter an output of the first hidden layer of the neural network using the first spectral pooling layer with a first non-integer stride and a first matrix filter to generate a first filtered output;
   provide the filtered output to the second hidden layer of the neural network;
   insert a second spectral pooling layer into the neural network directly between the second hidden layer of the neural network and a third hidden layer of the neural network;
   filter an output of the second hidden layer of the neural network using the second spectral pooling layer with a second non-integer stride to generate a second filtered output; and
   provide the second filtered output to the third hidden layer of the neural network.

8. The computing system of claim 7, wherein filtering the output of the first hidden layer of the neural network using the spectral pooling layer includes:
   generating the matrix filter.

9. The computing system of claim 8, wherein generating the matrix filter includes:
   generating a complex matrix representation of a discrete Fourier transform.

10. The computing system of claim 9, wherein generating the matrix filter includes:
    generating a coefficient filtering matrix.

11. The computing system of claim 10, wherein generating the matrix filter includes:
    generating a complex matrix representation of an inverse Fourier transform.

12. The computing system of claim 11, wherein filtering the output of the first hidden layer of the neural network using the first spectral pooling layer includes:
    generating the matrix filter by multiplying the complex matrix representation of the discrete Fourier transform, the coefficient filtering matrix, and the complex matrix representation of an inverse Fourier transform; and
    generating the filtered output by multiplying the output of the first hidden layer of the neural network and the matrix filter.

13. A hardware storage device having a plurality of instructions stored thereon which, when executed by a processor, cause the processor to perform operations comprising:
    inserting a first spectral pooling layer into a neural network of a speech processing system directly between a first hidden layer of the neural network and a second hidden layer of the neural network;

filtering an output of the first hidden layer of the neural network using the first spectral pooling layer with a first non-integer stride and a first complex matrix filter to generate a first filtered output by multiplying the output of the first hidden layer of the neural network by a real portion of the first complex matrix filter;

providing the first filtered output to the second hidden layer of the neural network;

inserting a second spectral pooling layer into the neural network directly between the second hidden layer of the neural network and a third hidden layer of the neural network;

filtering an output of the second hidden layer using the second spectral pooling layer with a second non-integer stride and a second complex matrix filter to generate a second filtered output by multiplying the output of the second hidden layer of the neural network by a real portion of the second complex matrix filter; and providing the second filtered output to the third hidden layer of the neural network.

14. The hardware storage device of claim 13, wherein filtering the output of the first hidden layer of the neural network using the spectral pooling layer includes:
generating the complex matrix filter.

15. The hardware storage device of claim 14, wherein generating the complex matrix filter includes:
generating a complex matrix representation of a discrete Fourier transform;
generating a coefficient filtering matrix;
generating a complex matrix representation of an inverse Fourier transform;
generating the matrix filter by multiplying the complex matrix representation of the discrete Fourier transform, the coefficient filtering matrix, and the complex matrix representation of an inverse Fourier transform; and
generating the filtered output by multiplying the output of the first hidden layer of the neural network and the matrix filter.

16. The hardware storage device of claim 13, wherein filtering the output of the hidden layer of the neural network using the spectral pooling layer includes:
distributing a stride value across a plurality of spectral pooling layers.

17. The hardware storage device of claim 13, wherein the speech processing system is a streaming automated speech recognition (ASR) system.

* * * * *